US012040972B2

(12) United States Patent
Inoue et al.

(10) Patent No.: US 12,040,972 B2
(45) Date of Patent: Jul. 16, 2024

(54) MANAGEMENT DEVICE, MANAGEMENT METHOD, AND MANAGEMENT PROGRAM

(71) Applicant: Nippon Telegraph and Telephone Corporation, Tokyo (JP)

(72) Inventors: Hiroki Inoue, Musashino (JP); Hiroshi Osawa, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 60 days.

(21) Appl. No.: 17/799,729

(22) PCT Filed: Feb. 18, 2020

(86) PCT No.: PCT/JP2020/006336
§ 371 (c)(1),
(2) Date: Aug. 15, 2022

(87) PCT Pub. No.: WO2021/166080
PCT Pub. Date: Aug. 26, 2021

(65) Prior Publication Data
US 2023/0072882 A1    Mar. 9, 2023

(51) Int. Cl.
*H04L 45/50* (2022.01)
*H04L 12/46* (2006.01)
*H04L 45/00* (2022.01)

(52) U.S. Cl.
CPC ........ *H04L 45/507* (2013.01); *H04L 12/4641* (2013.01); *H04L 45/54* (2013.01); *H04L 45/566* (2013.01)

(58) Field of Classification Search
CPC ... H04L 45/507; H04L 12/4641; H04L 45/54; H04L 45/566
See application file for complete search history.

(56) References Cited

U.S. PATENT DOCUMENTS

2011/0032843 A1\* 2/2011 Papp ................... H04L 12/4666
370/254
2020/0028786 A1\* 1/2020 Chachmon .............. H04L 45/38

FOREIGN PATENT DOCUMENTS

| JP | 2002281084 | 9/2002 | |
| JP | 2017147499 | 8/2017 | |
| WO | WO-02080474 A1 \* | 10/2002 | ............. H04L 45/04 |

\* cited by examiner

*Primary Examiner* — Ryan J Jakovac
(74) *Attorney, Agent, or Firm* — Fish & Richardson P.C.

(57) ABSTRACT

A management device includes: a management table acquisition unit that acquires at least a first management table in which an MPLS tunnel and a first label for in-network delivery are associated with each other, and a second management table in which an MPLS tunnel, a second label for specifying a CE router that is an output destination from an egress PE router, and identification information of a VPN to which the CE router that is the output destination belongs are associated with each other, the first management table being included in a node that is a copy source in an MPLS network, the second management table being included in an egress PE router as an output destination of a packet; and a VPN identification unit that collates the first label of the copied packet with the first management table to identify an MPLS tunnel through which the packet passes.

15 Claims, 18 Drawing Sheets

Fig. 4

| VPN IDENTIFIER | IF IDENTIFIER | IN-NETWORK INPUT KEY: CE SPECIFYING LABEL OF INGRESS PE | OFF-NETWORK INPUT KEY: MPLS TUNNEL IDENTIFIER | IN-NETWORK DELIVERY KEY: IN-NETWORK DELIVERY LABEL | OUTPUT DESTINATION: MPLS TUNNEL IDENTIFIER | OUTPUT DESTINATION: CE SPECIFYING LABEL OF EGRESS PE |
|---|---|---|---|---|---|---|
| A | IF1 | 1 |  | 100 | LSP1 | 1 |
| B | IF2 | 2 | LSP10 | 200 | LSP2 | 3 |

| OFF-NETWORK OUTPUT KEY: MPLS TUNNEL IDENTIFIER | OUTPUT DESTINATION: CE SPECIFYING LABEL OF EGRESS PE | VPN IDENTIFIER |
|---|---|---|
| LSP1 | 1 | A |
| LSP638 | 3 | B |

Fig. 15

| NODE IDENTIFIER | IF IDENTIFIER | IN-NETWORK INPUT KEY: CE SPECIFYING LABEL OF INGRESS PE | OFF-NETWORK INPUT KEY: MPLS TUNNEL IDENTIFIER | IN-NETWORK DELIVERY KEY: IN-NETWORK DELIVERY LABEL | OUTPUT DESTINATION: MPLS TUNNEL IDENTIFIER | OUTPUT DESTINATION: CE SPECIFYING LABEL OF EGRESS PE | VPN IDENTIFIER |
|---|---|---|---|---|---|---|---|
| PE0 | IF1 | 1 | N/A | N/A | LSP1 | N/A | |
| PE0 | IF1 | N/A | LSP10 | N/A | N/A | 1 | A |
| P1 | IF1 | N/A | N/A | 100 | LSP1 | N/A | |
| P1 | IF2 | N/A | N/A | 200 | LSP10 | N/A | |
| P1 | IF2 | N/A | N/A | 200 | LSP10 | N/A | |
| P1 | IF3 | N/A | N/A | 100 | LSP1 | N/A | |
| P1 | IF4 | N/A | N/A | 100 | LSP50 | N/A | |
| PE1 | IF1 | N/A | LSP1 | N/A | LSP50 | 1 | A |
| PE1 | IF1 | 1 | N/A | N/A | LSP10 | N/A | |

US 12,040,972 B2

MANAGEMENT DEVICE, MANAGEMENT METHOD, AND MANAGEMENT PROGRAM

CROSS-REFERENCE TO RELATED APPLICATIONS

This application is a National Stage application under 35 U.S.C. § 371 of International Application No. PCT/JP2020/006336, having an International Filing Date of Feb. 18, 2020. The disclosure of the prior application is considered part of the disclosure of this application, and is incorporated by reference in its entirety into this application.

TECHNICAL FIELD

The present invention relates to a management device, a management method, and a management program.

BACKGROUND ART

A multi-protocol label switching (MPLS) technology serves to attach a fixed-length label to the packet and transfer the packet, which enables high-speed transfer of a packet. In MPLS, a label is applied to a packet in a node (service provider's edge router: PE router) provided to an edge of an MPLS network, and a forwarding process is performed based on label information via a label switched path (LSP) set from an entrance to an exit of the MPLS network. The LSP is a single direction path and is connected by P2P.

CITATION LIST

Patent Literature

PTL 1: JP 2002-281084 A
PTL 2: JP 2017-147499 A

SUMMARY OF THE INVENTION

Technical Problem

FIGS. 17 and 18 are diagrams illustrating the MPLS technology. As illustrated in FIG. 17, MPLS can construct a virtual private network (VPN) by associating, on each PE of the MPLS network, an LSP with a VPN to which the LSP belongs by VPN identifiers exchanged between PEs at ends (see (1) in FIG. 17), and associating a port on a customer's edge (CE) router side and each LSP with each other (see (2) in FIG. 17).

To the packet of the VPN circulating in the MPLS network, the following MPLS labels are applied: an MPLS label for in-network delivery; and an MPLS label for identifying an CE router to which the packet is output, among the CE routers accommodated in the PE router when the packet leaves the MPLS network.

Since the former label is a label applied to indicate the egress PE router, it is not related to the VPN. Although the latter label functions in the egress PE as information for specifying the destination CE router, each node has its own rule for MPLS label assignment. And thus, in a case where the CE routers belong to the same VPN but are accommodated in different PE routers, the label may not be always matched among all the PE routers in the MPLS network for specifying the CE router. The latter label may also have the same label value for different VPNs.

For this reason, as illustrated in FIG. 18, when a packet is copied at a point in the MPLS network (see (1) in FIG. 18), the VPN of the packet cannot be identified only by the label information (see (2) in FIG. 18), and thus, it is unable to identify and handle the cause for each VPN when a failure or the like occurs.

The present invention has been made in view of the above, and an object thereof is to provide a management device, a management method, and a management program capable of identifying a VPN of a packet acquired at a point in an MPLS network.

Means for Solving the Problem

In order to solve the problems described above and achieve the object, according to the present invention, a management device manages an MPLS network communication system, and includes: a first acquisition unit configured to acquire a packet copied from a node in an MPLS network; a second acquisition unit configured to acquire at least a first management table in which identification information of an MPLS tunnel and a first label for in-network delivery are associated with each other, and a second management table in which identification information of an MPLS tunnel, a second label for specifying a CE router serving as an output destination from an egress PE router, and information for identifying a VPN to which the CE router serving as the output destination belongs are associated with each other, the first management table being included in a node that is a copy source, the second management table being included in the egress PE router that is an output destination of the packet; and an identification unit configured to collate the first label attached to the packet with the first management table to identify the MPLS tunnel through which the packet passes, identify the egress PE router to which the packet is output based on the identified MPLS tunnel, and identify the VPN of the packet based on the CE router serving as the output destination from the egress PE router identified by collating the second management table of the identified egress PE router with the second label attached to the packet.

Further, according to the present invention, a management method executed by a management device that manages an MPLS network communication system includes: acquiring a packet copied from a node in an MPLS network; acquiring at least a first management table in which identification information of an MPLS tunnel and a first label for in-network delivery are associated with each other, and a second management table in which identification information of an MPLS tunnel, a second label for specifying a CE router serving as an output destination from an egress PE router, and information for identifying a VPN to which the CE router serving as the output destination belongs are associated with each other, the first management table being included in a node that is a copy source, the second management table being included in the egress PE router that is an output destination of the packet; and identifying the VPN of the packet by collating the first label attached to the packet with the first management table to identify the MPLS tunnel through which the packet passes, identifying the egress PE router to which the packet is output based on the identified MPLS tunnel, and applying the CE router serving as the output destination from the egress PE router identified by collating the second management table of the identified egress PE router with the second label attached to the packet.

In addition, a management program of the present invention causes a computer to execute: acquiring a packet copied from a node in an MPLS network; acquiring at least a first management table in which identification information of an MPLS tunnel and a first label for in-network delivery are associated with each other, and a second management table in which identification information of an MPLS tunnel, a second label for specifying a CE router serving as an output destination from an egress PE router, and information for identifying a VPN to which the CE router serving as the output destination belongs are associated with each other, the first management table being included in a node that is a copy source, the second management table being included in the egress PE router that is an output destination of the packet; and identifying the VPN of the packet by collating the first label attached to the packet with the first management table to identify the MPLS tunnel through which the packet passes, identifying the egress PE router to which the packet is output based on the identified MPLS tunnel, and applying the CE router serving as the output destination from the egress PE router identified by collating the second management table of the identified egress PE router with the second label attached to the packet.

Effects of the Invention

According to the present invention, it is possible to identify a VPN of a packet acquired at a point in the MPLS network.

BRIEF DESCRIPTION OF DRAWINGS

FIG. 4 is a diagram showing an exemplary data configuration of a management table stored in the management table DB.

FIG. 6 is a diagram showing an exemplary data configuration of a management table stored in the management table DB.

FIG. 15 is a diagram showing an exemplary data configuration of a management table integrated by a second acquisition unit.

DESCRIPTION OF EMBODIMENTS

Hereinafter, an embodiment of the present invention will be described in detail with reference to the drawings. The present invention is not limited to the embodiment. Further, in description of the drawings, the same parts are denoted by the same reference signs.

Embodiment

A management device according to the present embodiment enables identification of a VPN of a packet copied in an optional node of an MPLS network by using an MPLS label management table of the node of the MPLS network and an MPLS label management table of a PE router at an egress, thereby improving the operability of the service, and identifying and handling the cause at the time of failure.

Figure 1:
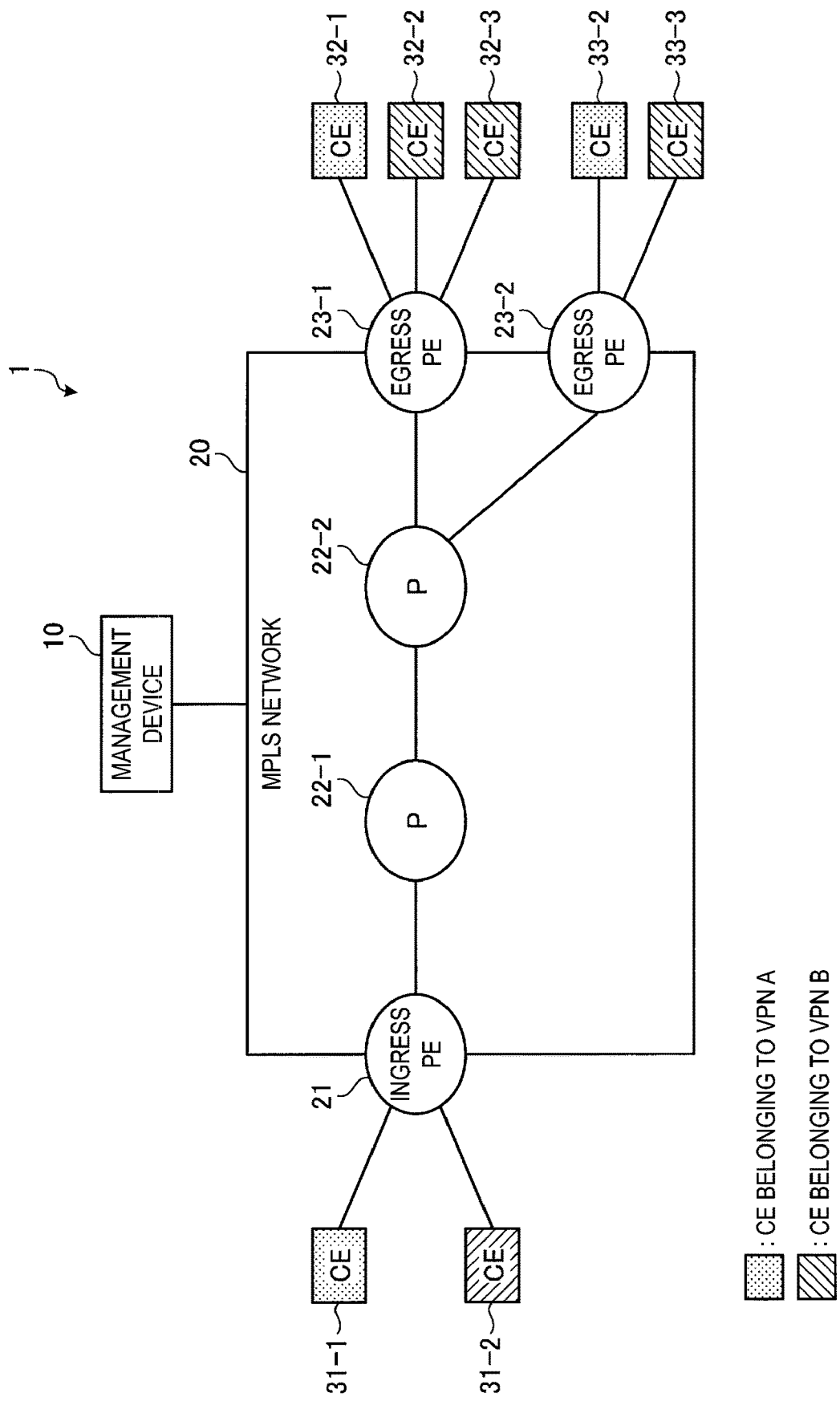
FIG. 1 is a diagram illustrating an exemplary configuration of a communication system according to an embodiment.

FIG. 1 is a diagram illustrating an exemplary configuration of a communication system according to an embodiment. A communication system 1 according to the present embodiment includes an MPLS network 20 that attaches an MPLS label to a packet and transfers the packet, and a management device 10 that manages the MPLS network 20.

The MPLS network 20 includes, for example, an ingress PE router 21, egress PE routers 23-1 and 23-2, and service provider's routers (P routers) 22-1 and 22-2 (nodes). Further, LSPs from the ingress PE router 21 to the egress PE routers 23-1 and 23-2 of the MPLS network are set respectively in the MPLS network 20.

The ingress PE router 21 accommodates a CE router 31-1 belonging to a VPN "A" and a CE router 31-2 belonging to a VPA "B". The ingress PE router 21 receives packets transmitted from the CE routers 31-1 and 31-2, attaches two types of MPLS labels to the received packets, and thereby the received packets pass through the LSP to the egress PE router 23-1 or the egress PE router 23-2.

The two types of MPLS labels are an MPLS label (first label) for in-network delivery corresponding to identification information of the LSP (MPLS tunnel) that passes a packet, and an MPLS label (second label) for specifying a CE router as an output destination from the egress PE routers 23-1 and 23-2. The ingress PE router 21 has an ingress-side management table (third management table). In the ingress-side management table, information for specifying a CE router as an input source of the ingress PE router 21, information for identifying a VPN to which the CE router as an input source belongs, identification information of the MPLS tunnel, a first label, and a second label are associated with each other. The ingress PE router 21 refers to the ingress-side management table, and attaches the first label and the second label to the received packet.

The P routers 22-1 and 22-2 have a management table (first management table) in which the identification information of the MPLS tunnel and the first label for in-network delivery are associated with each other. When receiving a packet transmitted from the PE router or another P router, the P routers 22-1 and 22-2 refer to the label attached to the packet and the first management table, and send the packet to the MPLS tunnel corresponding to the first label.

The egress PE router 23-1 accommodates a CE router 32-1 belonging to the VPN "A" and CE routers 32-2 and 32-3 belonging to the VPA "B". The egress PE router 23-2 accommodates a CE router 33-2 belonging to the VPN "A" and a CE router 33-3 belonging to the VPA "B". The egress PE routers 23-1 and 23-2 have a management table (second management table) in which the identification information of the MPLS tunnel, the second label, and information for identifying the VPN to which the CE router serving as the output destination belongs are associated with each other. The egress PE routers 23-1 and 23-2 refer to the second label and the second management table of the packet received from the P router 22-2, and output the received packet to the CE router corresponding to the second label.

The management device 10 manages the MPLS network 20. The management device 10 identifies a VPN of a packet copied by optional P routers 22-1 and 22-2 in the MPLS network. The management device 10 acquires at least the first management table of the P routers 22-1 and 22-2 that are copy sources and the second management table of the egress PE routers 23-1 and 23-2 that are the output destination of the packet. Then, the management device 10 identifies the VPN of the copied packet based on the label attached to the copied packet, the first management table, and the second management table.

Management Device

Figure 2:
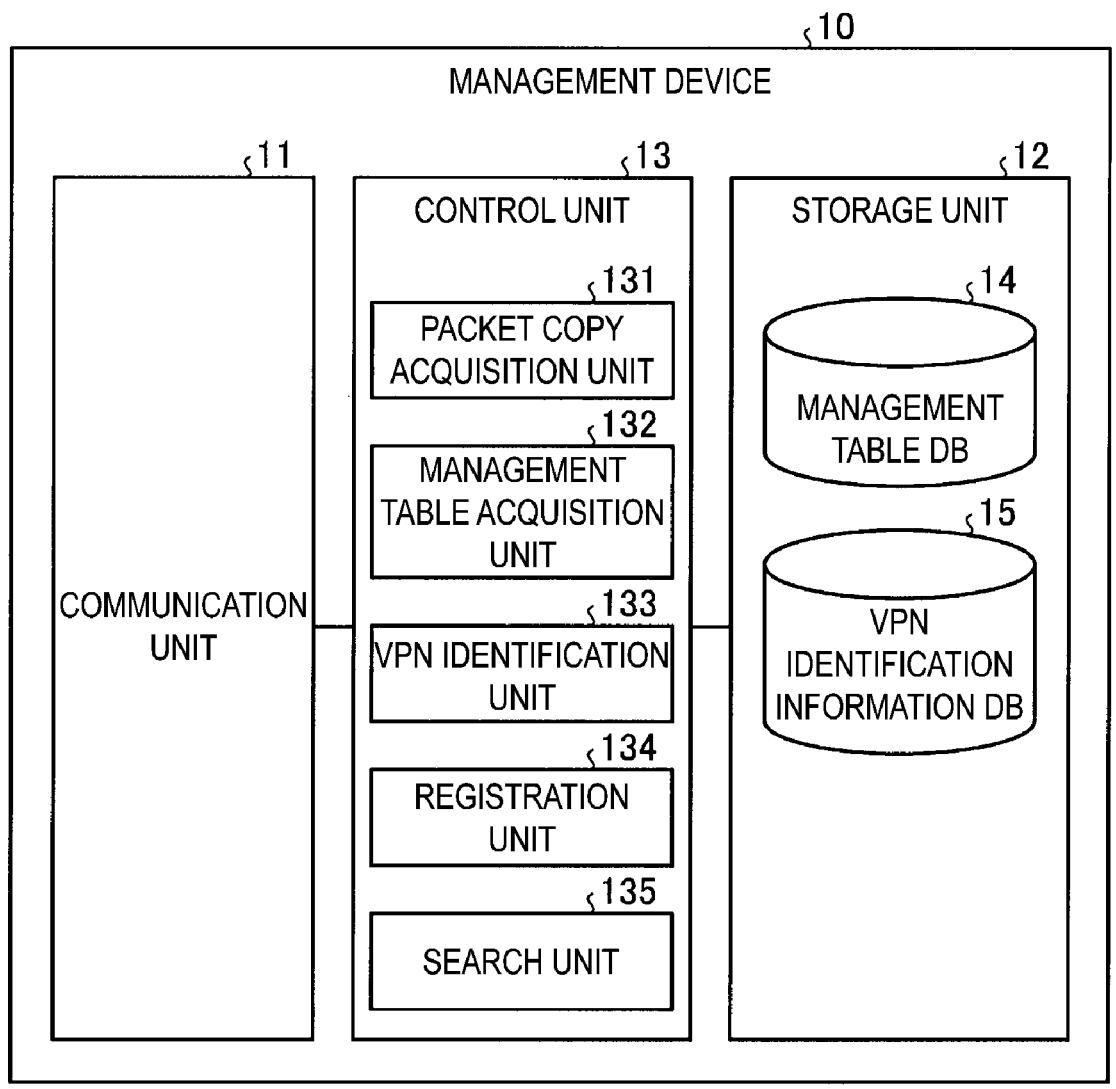
FIG. 2 is a diagram illustrating an exemplary configuration of a management device.

Next, the management device 10 will be described. FIG. 2 is a diagram illustrating an exemplary configuration of the management device 10. As illustrated in FIG. 2, the management device 10 includes a communication unit 11, a storage unit 12, and a control unit 13.

The communication unit 11 is a communication interface that transmits and/or receives various information to and/or from another device connected via a network or the like. The communication unit 11 is implemented by a network interface card (NIC) or the like, and performs communication between another device (for example, each router in the MPLS network 20) and the control unit 13 (described later) via an electric communication line such as a local area network (LAN) or the Internet. The communication unit 11 is connected to an external device via a network or the like, for example, and receives an input of a packet of a traffic to be learned.

The storage unit 12 is implemented by a semiconductor memory element such as a random access memory (RAM) or a flash memory, or a storage device such as a hard disk or an optical disc, and stores a processing program for operating the management device 10, data used during execution of the processing program, and the like. The storage unit 12 includes a management table DB 14 and a VPN identification information DB 15.

The management table DB 14 stores a management table for managing communication in the MPLS network 20. FIGS. 3 to 7 are diagrams each showing an exemplary data configuration of the management table stored in the management table DB 14.

Figure 3:
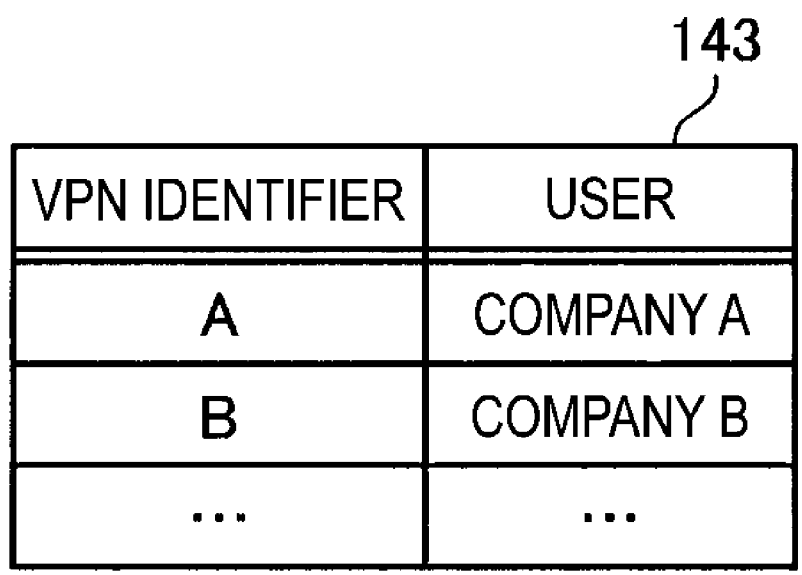
FIG. 3 is a diagram showing an exemplary data configuration of a management table stored in a management table database (DB).

FIG. 3 shows a VPN management table 143. As illustrated in FIG. 3, in the VPN management table 143, a VPN identifier and user information of the VPN are associated with each other. For example, the VPN management table 143 indicates that a user of a VPN identifier "A" is a "company A".

FIG. 4 shows an ingress-side management table 140 (third management table) of the ingress PE router 21. As illustrated in FIG. 4, in the ingress-side management table 140 of the ingress PE router 21, specific information of a CE router that is an input source of the ingress PE router 21, an identifier of a VPN to which the CE router belongs, an identifier of an MPLS tunnel, a first label for in-network delivery, and a second label for specifying the CE router of the egress PE are associated with each other. For example, the specific information of the CE router that is an input source is an IF number on the input side of the ingress PE router 21 or a label corresponding to each CE router. The ingress-side management table 140 indicates that a packet input from "IF1" is a packet transmitted from the CE router belonging to the VPN "A", and indicates that the first label "100" for in-network delivery and the second label "1" for specifying the CE router of the egress PE are attached to this packet.

Figure 5:
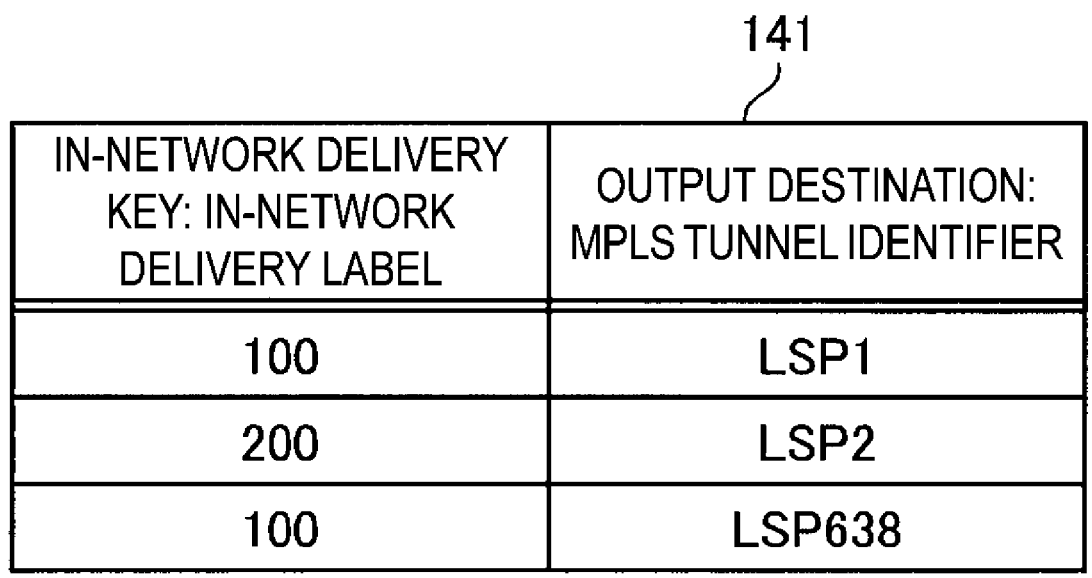
FIG. 5 is a diagram showing an exemplary data configuration of a management table stored in the management table DB.

FIG. 5 shows a first management table 141 of the P router 22-1. As illustrated in FIG. 5, in the first management table 141, a label for in-network delivery that is the first label and the MPLS tunnel identifier that is an output destination are associated with each other. In the first management table 141, for example, an "LSP1" is associated with an in-network delivery label "100". The in-network delivery label functions as an in-network delivery key.

FIG. 6 shows a second management table 142-1 of the egress PE router 23-1. As illustrated in FIG. 6, in the second management table 142-1, the MPLS tunnel identifier, the second label for specifying the CE router serving as the output destination from the egress PE router 23-1, and the VPN identifier indicating a VPN that accommodates the CE router as the output destination are associated with each other. The second label is, for example, an IF number on the output side of the egress PE router 23-1. The second management table 142-1 indicates that, for example, the output destination of the packet passing through the "LSP1" is IF "1" of the egress PE router 23-1, and the CE router connected to the IF "1" belongs to the VPN "A". The MPLS tunnel identifier functions as an off-network output key.

Figure 7:
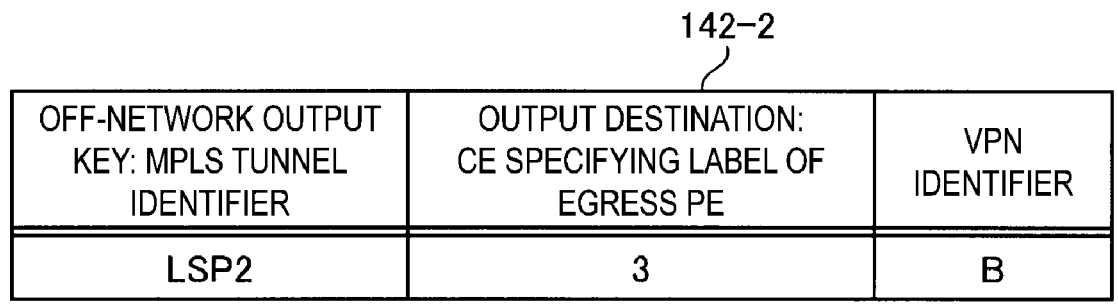
FIG. 7 is a diagram showing an exemplary data configuration of a management table stored in the management table DB.

In addition, FIG. 7 shows a second management table 142-2 of the egress PE router 23-2. In the second management table 142-2, similarly to the second management table 142-1, the MPLS tunnel identifier, the second label, and the identifier of the VPN that accommodates the CE router as the output destination are associated with each other.

Figure 8:
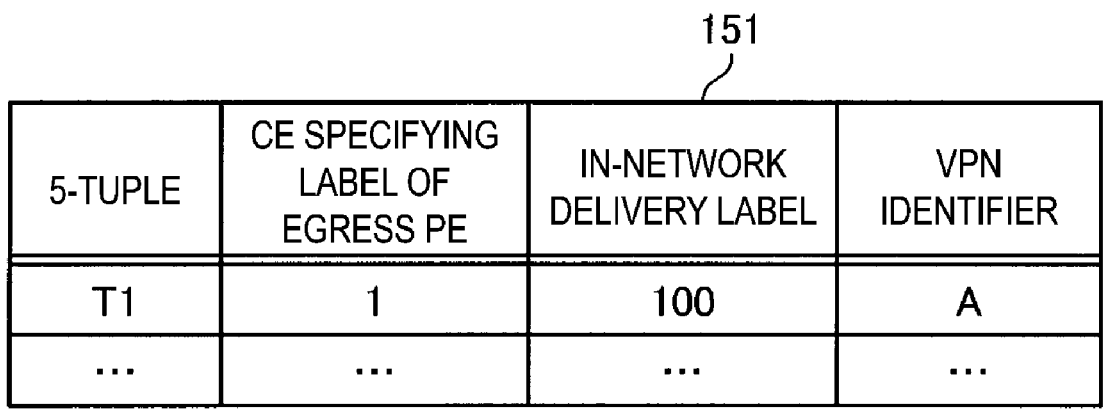
FIG. 8 is a diagram showing an exemplary identification table stored in a VPN identification information DB.

The VPN identification information DB 15 stores identification information of VPNs of packets copied from nodes. FIG. 8 is a diagram showing an exemplary identification table stored in the VPN identification information DB 15.

As illustrated in FIG. 8, in the identification table 151, information on the packet copied from the node, and an identifier of the VPN of the packet are associated with each other. In the identification table 151, a 5-tuple of the packet, the second label for specifying the CE router serving as the output destination from the egress PE routers 23-1 and 23-2 serving as the output destination of the packet, and the first label for in-network delivery are registered as the information on the packet.

The control unit 13 includes an internal memory for storing programs that define various processing procedures or the like and required data, and executes various types of processing using the programs and the data. For example, the control unit 13 is an electronic circuit such as a central processing unit (CPU) or a micro processing unit (MPU). The control unit 13 includes a packet copy acquisition unit 131, a management table acquisition unit 132, a VPN identification unit 133, a registration unit 134, and a search unit 135.

The packet copy acquisition unit 131 acquires a packet copied from a node (P router) in the MPLS network 20. The acquired packet is a VPN identification target packet.

The management table acquisition unit 132 acquires the first management table included in the P routers 22-1 and 22-2 that are packet copy sources and the second management table included in the egress PE routers 23-1 and 23-2. The management table acquisition unit 132 acquires the management tables of all the nodes (P routers) and all the edge routers (the ingress PE router and the egress PE routers) of the MPLS network 20. In addition, the management table acquisition unit 132 periodically acquires the management tables of all the nodes and all the edge routers of the MPLS network 20. The management table acquisition unit 132 causes the acquired management tables to be stored in the management table DB 14.

The VPN identification unit 133 collates the first label attached to the copied packet with the first management table to identify the MPLS tunnel through which the copied packet passes. Then, the VPN identification unit 133 identifies the egress PE router to which the copied packet is output, based on the identified MPLS tunnel. Subsequently, the VPN identification unit 133 identifies a CE router serving as the output destination from the egress PE router by collating the second management table of the identified egress PE router with the second label attached to the copied packet.

Then, the VPN identification unit 133 identifies the VPN of the copied packet based on the CE router serving as the output destination from the identified egress PE router. That is, the VPN identification unit 133 uses the second management table of the identified egress PE router to identify the VPN to which the CE router serving as the output destination from the identified egress PE router belongs, thereby identifying the VPN of the copied packet. Furthermore, the VPN identification unit 133 can also identify an actual user by collating the identified VPN with the VPN management table. The management device 10 outputs identification information by the VPN identification unit 133.

Figure 9:
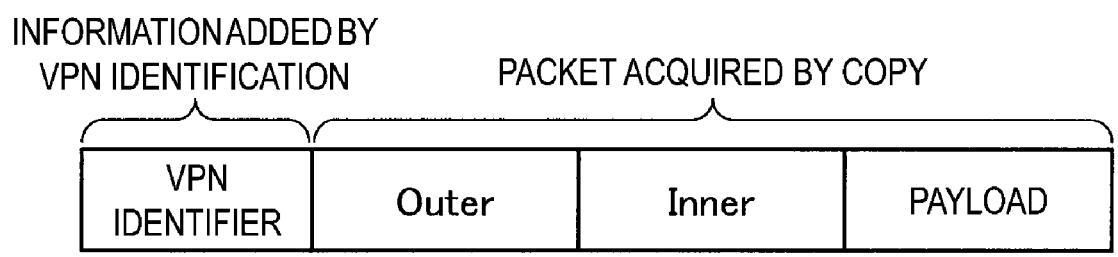
FIG. 9 is a diagram showing an exemplary format of output data of the management device.

FIG. 9 is a diagram showing an exemplary format of output data of the management device 10. As shown in FIG. 9, for example, in response to a VPN identification request of a packet, the management device 10 outputs data obtained by adding the VPN identifier identified by the VPN identification unit 133 to an outer header, an inner header, and a payload of the packet acquired by copy as identification information. By checking the output data, an administrator can recognize the VPN of the packet copied from a node in the MPLS network 20, thereby being capable of improving the operability of the service, and identifying and handling the cause at the time of failure.

The registration unit 134 registers the identification information of the VPN identified by the VPN identification unit 133 in the VPN identification information DB 15 in association with the 5-tuple information and the first and second label information of the copied packet.

The search unit 135 searches the identification table 151 stored in the VPN identification information DB 15 and acquires information of a search target. Specifically, the search unit 135 searches the packet from the identification table 151 using the VPN identifier as a search key. In addition, the search unit 135 searches the identifier of the VPN of the packet from the identification table 151 using the 5-tuple of the packet as a search key. Since the 5-tuple of the packet, the second label, and the first label are registered in the identification table 151 in association with the identifier of the VPN, the search unit 135 can search the VPN using the second label and the first label as search keys in addition to the 5-tuple of the packet. In this manner, the management device 10 can also perform VNP identification on the packet copied from the node afterwards.

Processing Flow

Figure 10:
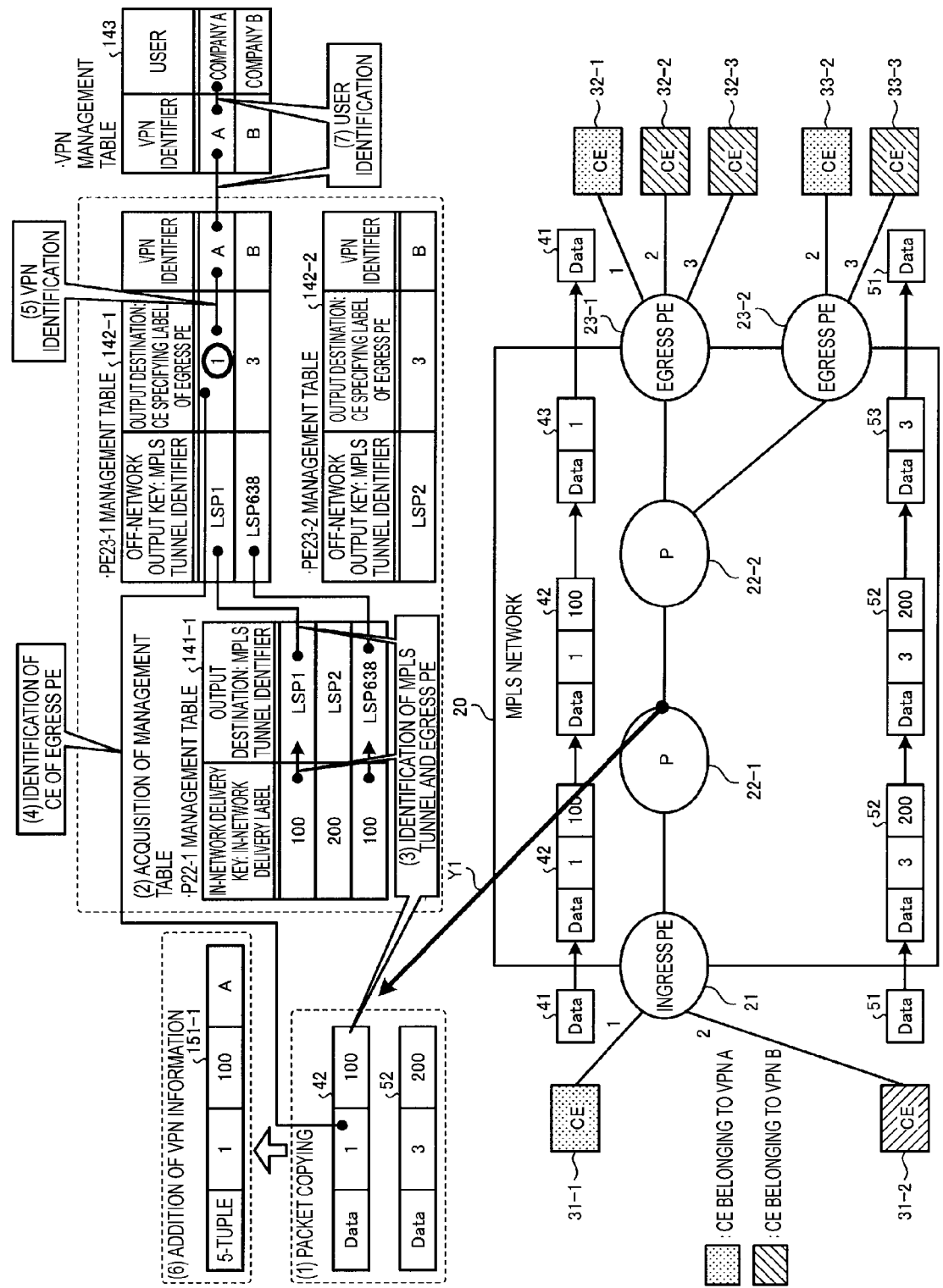
FIG. 10 is a diagram illustrating a flow of processing up to VPN identification of a packet in the communication system.

Next, a description will be provided about a flow of processing up to VPN identification of a packet in the MPLS network 20 by the management device 10. FIG. 10 is a diagram illustrating the flow of processing up to VPN identification of a packet in the communication system 1. The number on the solid line in the left direction of the ingress PE router 21 indicates the IF number on the input side. The number on the solid line in the right direction of the egress PE routers 23-1 and 23-2 indicates the IF number on the output side.

As indicated by an arrow Y1 in FIG. 10, the management device 10 copies a packet from a node for VPN identification (see (1) in FIG. 10). As illustrated in packets 42 and 52, the packet acquired by the management device 10 has a configuration in which the first label and the second label are attached to Data 41 and Data 51, respectively. In FIG. 10, processing of identifying the VPN of the packet 42 copied from the P router 22-1 will be described as an example.

The management device 10 acquires the management tables from nodes and edge routers (see (2) in FIG. 10). Specifically, the management device 10 acquires the first management table 141-1 from the P router 22-1 that is a packet copy source, and acquires the second management tables 142-1 and 142-2 from the egress PE routers 23-1 and 23-2.

Subsequently, the management device 10 collates the first label "100" attached to the copied packet 42 with the first management table 141-1 to identify MPLS tunnels "LSP1" and "LSP638" through which the copied packet passes (see (3) in FIG. 10). Then, the management device 10 refers to the second management tables 142-1 and 142-2 and identifies the egress PE router 23-1 that is the egress of the MPLS tunnels "LSP1" and "LSP638" as the egress PE router that outputs the packet 42 (see (3) in FIG. 10).

Then, the management device 10 collates the second management table 142-1 of the identified egress PE router 23-1 with the second label "1" attached to the packet 42, and identifies "1" as the label of the CE router serving as the output destination from the egress PE router 23-1 (see (4) in FIG. 10). Then, the management device 10 identifies "A" as the VPN to which the CE router "1" serving as the output destination from the egress PE router 23-1 belongs by using the VPN identifier (route target value, description, and the like) shown in the second management table 142-1 of the egress PE router 23-1 (see (5) in FIG. 10).

The management device 10 registers data 151-1 (see (6) in FIG. 10) obtained by adding the specified VPN identifier "A" as a search key to the 5-tuple and the first and second labels of the copied packet in the VPN identification information DB 15, so that the VPN of the copied packet can be identified afterwards.

Further, the management device 10 can identify the "company A" as the user of the VPN "A" by collating the identified VPN "A" with the VPN management table 143 (see (7) in FIG. 10).

Processing Procedure of Identification Process

Figure 11:
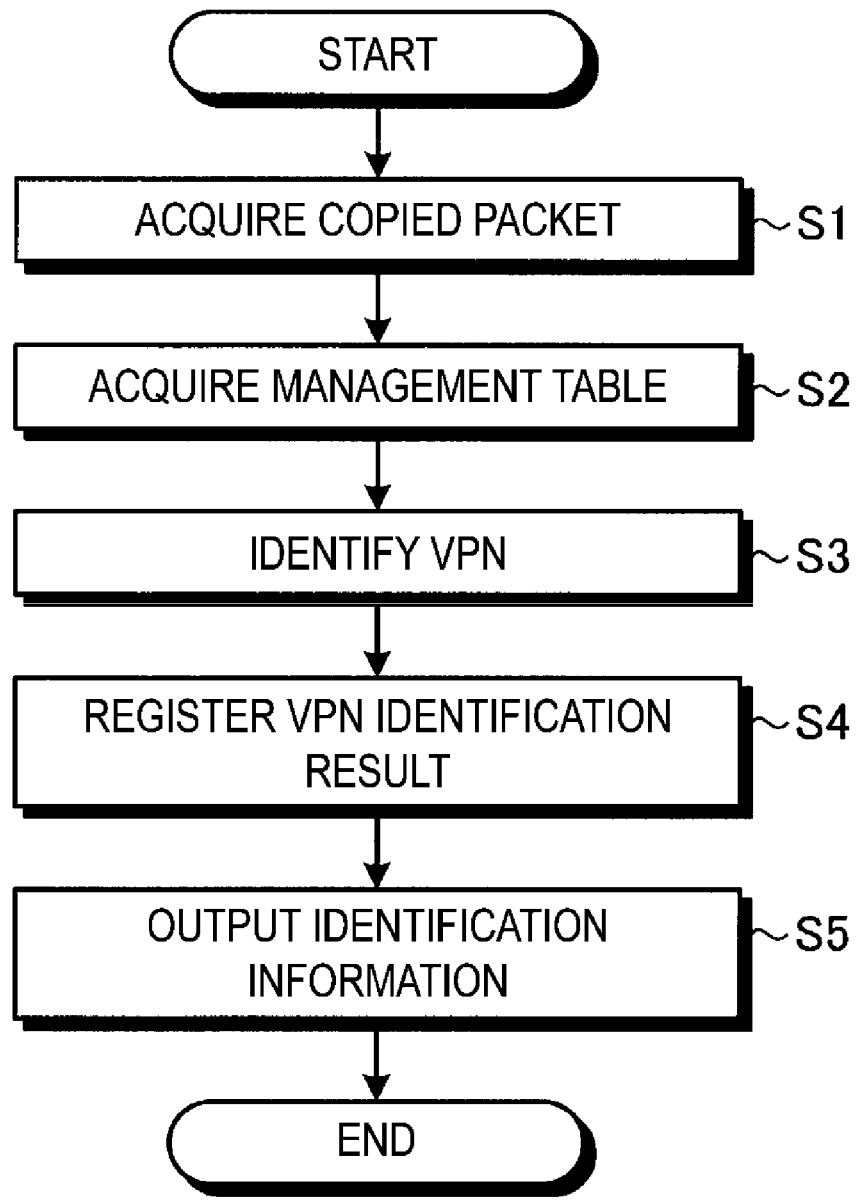
FIG. 11 is a flowchart illustrating a processing procedure of a VPN identification process according to the embodiment.

Next, a description will be provided about a processing procedure of a VPN identification process of the packet by the management device 10. FIG. 11 is a flowchart illustrating the processing procedure of the VPN identification process according to the embodiment.

As illustrated in FIG. 11, the management device 10 acquires a packet copied from a node in the MPLS network 20 (step S1). The management device 10 acquires the management tables of all the nodes and all the edge routers in the MPLS network 20 (step S2).

Then, the management device 10 identifies the VPN of the copied packet (step S3). The management device 10 collates the first label attached to the copied packet with the first management table of the node that is a copy source to identify the MPLS tunnel through which the copied packet passes. Then, the management device 10 identifies the egress PE router to which the copied packet is output based on the identified MPLS tunnel. Then, the management device 10 identifies the VPN of the copied packet based on the CE router serving as the output destination from the egress PE router identified by collating the second management table of the identified egress PE router with the second label attached to the copied packet.

The management device 10 registers the identification information of the identified VPN in the VPN identification information DB 15 in association with the 5-tuple information and the first and second label information of the copied packet (step S4). In addition, the management device 10 outputs data obtained by adding the identified VPN identifier to an outer header, an inner header, and a payload of the copied packet as identification information (step S5).

Processing Procedure of Search Process

Figure 12:
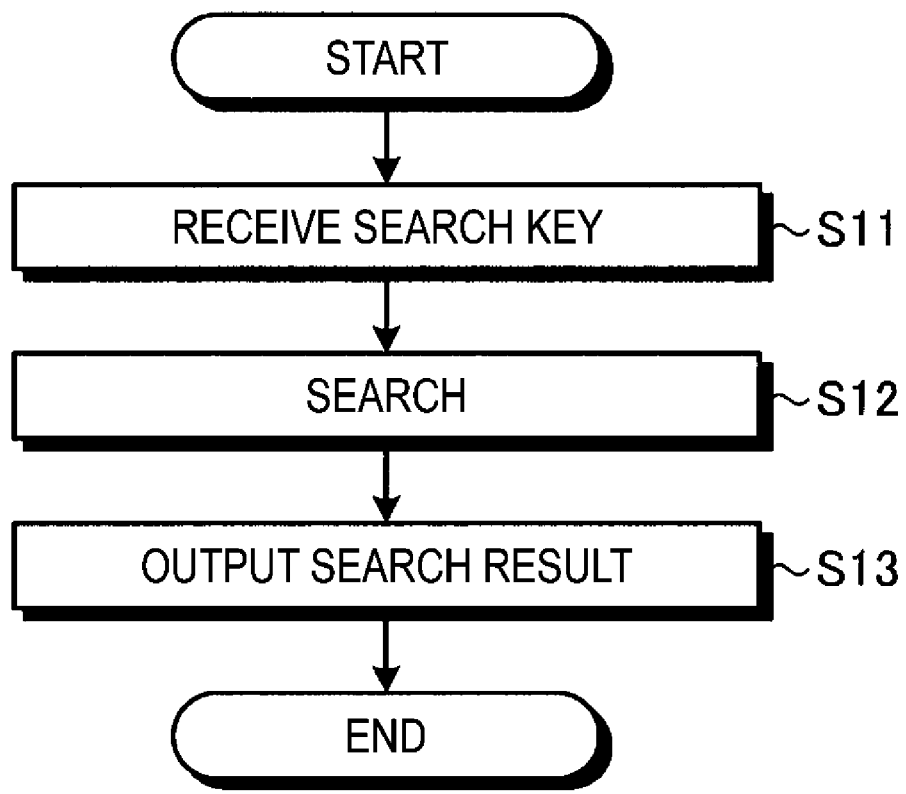
FIG. 12 is a flowchart illustrating a processing procedure of a search process executed by the management device.

Next, a processing procedure of a search process on the identification table 151 registered in the VPN identification information DB 15 is searched. FIG. 12 is a flowchart illustrating the processing procedure of the search process executed by the management device 10.

As illustrated in FIG. 12, the management device 10 receives a search key (step S11). The search key is a VPN identifier. In addition, the search key may be the 5-tuple, or the first or second label of the packet. The management device 10 searches the identification table 151 using the search key (step S12) and outputs a search result (step S13).

Effects of Embodiment

As described above, the management device 10 according to the embodiment acquires the packet copied from a node in the MPLS network. Then, the management device 10 acquires at least the first management table in which the identification information of the MPLS tunnel and the first label for in-network delivery are associated with each other, and the second management table in which the identification information of the MPLS tunnel, the second label for specifying the CE router serving as the output destination from the egress PE router, and the information for identifying the VPN to which the CE router serving as the output destination belongs are associated with each other. The first management table is included in the node as a copy source, and the second management table is included in the egress PE router as the output destination of the packet. Then, the management device 10 collates the first label attached to the copied packet with the first management table to identify the MPLS tunnel through which the copied packet passes, identifies the egress PE router to which the copied packet is output based on the identified MPLS tunnel, and identifies the VPN of the copied packet based on the CE router serving as the output destination from the egress PE router identified by collating the second management table of the identified egress PE router with the second label attached to the copied packet.

As a result, the management device 10 can identify the VPN of the packet copied in a node of the MPLS network. Then, according to the management device 10, by identifying the VPN of the packet, it is possible to improve the operability of the service, and to identify and handle the cause at the time of failure.

In addition, the management device 10 registers the identification information of the identified VPN in the VPN identification information DB 15 in association with the 5-tuple information and the label information of the copied packet. By searching the VPN identification information DB 15 using the VPN identifier as a search key, the management device 10 can also perform VNP identification on the packet copied from the node afterwards.

First Modification Embodiment

In the second management tables 142-1 and 142-2, reference commands and displays are different depending on a router vendor and a VPN type (L3VPN, L2VPN).

For example, the VPN identifier may be described not in the second management tables 142-1 and 142-2 but in a management table provided separately. In this case, the management device 10 may refer to another management table that can collate the second label for specifying the CE router serving as the output destination from the identified egress PE router with the VPN identifier. Specifically, in the L2VPN of a certain vendor, the second label specifying label for specifying the CE router serving as the output destination from the egress PE router can be collated with the VPN identifier by separately referring to the ingress PE-egress PE router CE specifying label correspondence table.

Second Modified Embodiment

In addition, the display of the second management tables 142-1 and 142-2 differs depending on the management design of the VPN identifier. For example, in the user identification of the VPN (see (7) in FIG. 10), whether the key of the VPN management table is managed by a route distinguisher (Rd) value or by a description is determined by an operation of an MPLS carrier. In addition, there are a case where the Rd value can be directly acquired from the VPN identifier by a router vendor and a case where the Rd value can be acquired through a description.

Here, a description will be provided about a case where it is desired to identify the user to which the selected VPN identifier belongs. At this time, the following three cases are conceivable depending on the operation policy of the MPLS carrier. Case 1 is a case where the VPN identifier is an Rd value, Case 2 is a case where the VPN identifier is a description, and Case 3 is a case where both the Rd value and the description are managed together for the VPN identifier.

In addition, the VPN identifier is described in the second management tables 142-1 and 142-2 and the ingress PE-egress PE router CE specifying label correspondence table described in the first modification embodiment. The following cases are conceivable for the VPN identifier by a router vendor. Case A is a case where the VPN identifier represents only the Rd value as it is, and Case B is a case where the VPN identifier represents only the description.

In the above cases of Case 3-A (case of Case 3 and Case A), Case 3-B (case of Case 3 and Case B), Case 1-A (case of Case 1 and Case A), and Case 2-B (case of Case 2 and Case B), the processing illustrated in (7) in FIG. 10 is performed, so that the user-specifying information is obtained.

In addition, in the cases of Case 1-B (case of Case 1 and Case B) and Case 2-A (case of Case 2 and Case A), since the user-specifying information is not obtained only by the processing illustrated in (7) in FIG. 10, the following procedure is added.

In the case of Case 1-B, that is, in the case where the management device 10 uses the Rd value as the VPN identifier and only the description is obtained, the management device 10 adds processing of subtracting the Rd value from the description. In addition, in the case of Case 2-B, that is, in the case where the management device 10 uses the description as the VPN identifier and only the Rd value is obtained, the management device 10 adds processing of subtracting the description from the Rd value. For this processing, the management device 10 acquires a table in which the description and the Rd value correspond to each other by issuing a display command. In addition, in a case where there is no command, since the MPLS carrier sets the association between the description and the Rd value in the configuration of the router, the management device 10 acquires the correspondence between the description and the Rd value from the setting information of the MPLS carrier.

Third Modified Embodiment

In the embodiment, the case where the management tables of all the nodes and all the edge routers of the MPLS network 20 are periodically acquired has been described. In this case, the number of analysis targets becomes enormous, and it seems to take a long time for the analysis. Therefore, the management device 10 may reduce the number of analysis targets by performing the following first or second processing.

For example, as the first processing, the management device 10 acquires only the management table of the node that is a copy source, for the first management table of the P router. Then, the management device 10 acquires the second management tables of the PE routers from all the PE routers in the MPLS network.

Further, as the second processing, the management device 10 acquires only the management table of the node that is a copy source, for the first management table of the P router. Then, when the egress PE router that is a destination can be recognized from the MPLS tunnel identifier acquired in the first management table of the P router that is a copy source, the management device 10 acquires the second management table only from the corresponding egress PE router. When the MPLS tunnel identifier is information that can specify the PE router, such as a loop-back address of the PE router, the management device 10 can recognize the egress PE router that is a destination, from the MPLS tunnel identifier.

Fourth Modification Embodiment

In the embodiment, the management device 10 collates the first management table 141 and the second management tables 142-1 and 142-2 with the first and second labels attached to the packet, thereby identifying the egress PE router and the CE router serving as the output destination of the packet. In addition, the management device 10 can identify the PE router on the ingress side and the CE router that is an input source by obtaining the ingress-side management table 140 of the ingress PE router 21.

First, the management device 10 periodically acquires the first management table, the second management table, and the ingress-side management table from all the nodes and all the PE routers of the MPLS network 20. Subsequently, the management device 10 collates the first management table of the copy source node with the first label for in-network delivery of the copied packet, and identifies the MPLS tunnel that is the output destination.

Further, the management device 10 also acquires the first management table of another node, and identifies the ingress PE router 21 from the first table of the node whose output destination is the identified MPLS tunnel identifier.

The management device 10 refers to the ingress-side management table of the identified ingress PE router 21 and identifies the CE specifying label of the ingress PE router 21 corresponding to the identified MPLS tunnel identifier. Then, the management device 10 identifies the VPN of the copied packet based on the CE specifying label of the ingress PE router 21 and the VPN identifier (the route distinguisher value and the description) of the ingress PE router 21.

Figure 13:
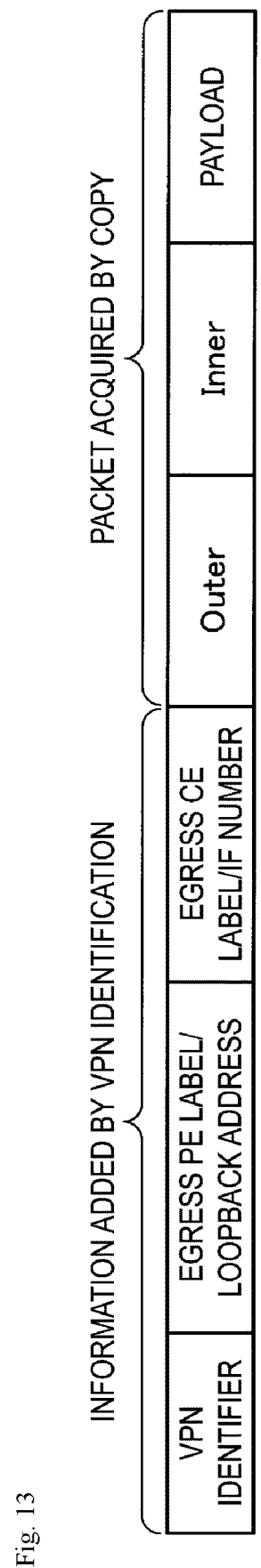
FIG. 13 is a diagram showing another exemplary format of output data of the management device.
Figure 14:
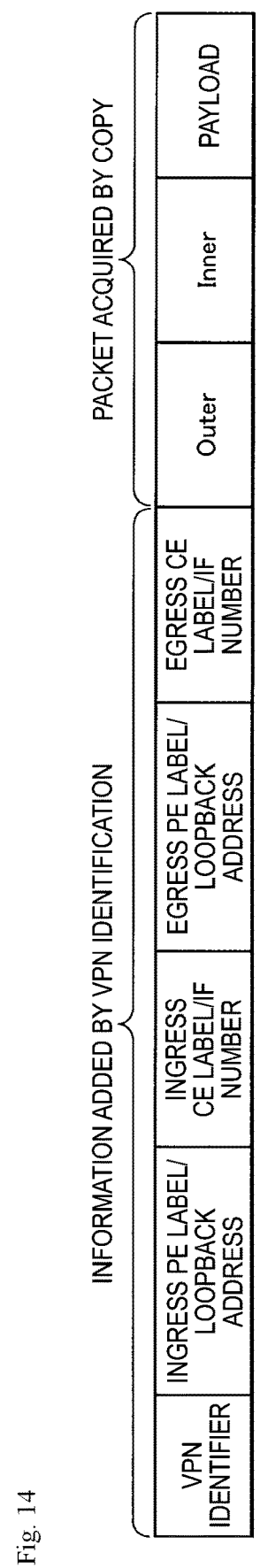
FIG. 14 is a diagram showing another exemplary format of output data of the management device.

FIGS. 13 and 14 are diagrams showing other examples of the format of the output data of the management device 10. In the embodiment, as shown in FIG. 13, the management device 10 can also output, as the identification information, data obtained by adding data related to the egress PE router (a loop-back address and an IF number) identified in the process of identification, in addition to the selected VPN identifier, to an outer header, an Inner header, and a payload acquired by copying the packet. Further, since the management device 10 can also identify the information on the ingress side in the fourth modification embodiment, as shown in FIG. 14, it is possible to output data obtained by further adding data related to the ingress PE router (a loopback address and an IF number) to the output data shown in FIG. 13.

By checking the output data shown in FIG. 14, an administrator can also recognize an input source from which PE router/CE router the copied packet is input and an output destination to which PE router/CE router the copied packet is output, which have been unclear until now.

Fifth Modification Embodiment

Furthermore, since the first label for in-network delivery applied in the MPLS network 20 is applied for each IF on the P router depending on vendor implementation, the same label may be applied to different destinations. Therefore, the management table acquisition unit 132 may integrate a plurality of acquired management tables in all the nodes and all the PE routers, and combine the route information for VPN identification into one management table.

FIG. 15 is a diagram showing an exemplary data configuration of a management table integrated by the management table acquisition unit 132. A management table 144 includes all items included in the first management table 141-1, the second management tables 142-1 and 142-2, and the ingress-side management table 140 as items. Specifically, as shown in FIG. 15, the management table 144 includes the following items: identification information of an ingress-side management table node, an IF identifier in a node, a CE router specifying label of an input PE router, an MPLS tunnel identifier that functions as an off-network output key, a first label for in-network delivery, an MPLS tunnel identifier as an output destination, a CE router specifying label of an egress PE router as an output destination, and a VPN identifier.

The second acquisition unit 142 generates the management table 144 by registering the value of each item of each of the acquired management tables in the corresponding field in each node. By integrating the plurality of management tables into one management table in the format shown in FIG. 15, the processing executed by the VPN identification unit 133 can be put into a script or the like and automated.

System Configuration and the Like

The components of the devices shown are functionally conceptual and are not necessarily physically configured as shown. That is, a specific form of distribution and integration of the respective devices is not limited to the one illustrated in the figure, and all or some of the devices can be configured to be functionally or physically distributed and integrated in optional units according to various loads, use situations, or the like. Further, all or any part of the processing functions performed in the devices may be realized by a CPU and a program to be interpreted/performed by the CPU or may be realized as hardware by a wired logic.

Further, all or some of the processes described as being performed automatically among the respective processes described in the embodiments can be performed manually, or all or some of the processes described as being performed manually can be performed automatically using a known method. In addition, information including the processing procedures, control procedures, specific names, and various types of data or parameters illustrated in the above document or drawings can be optionally changed unless otherwise specified.

Program

Figure 16:
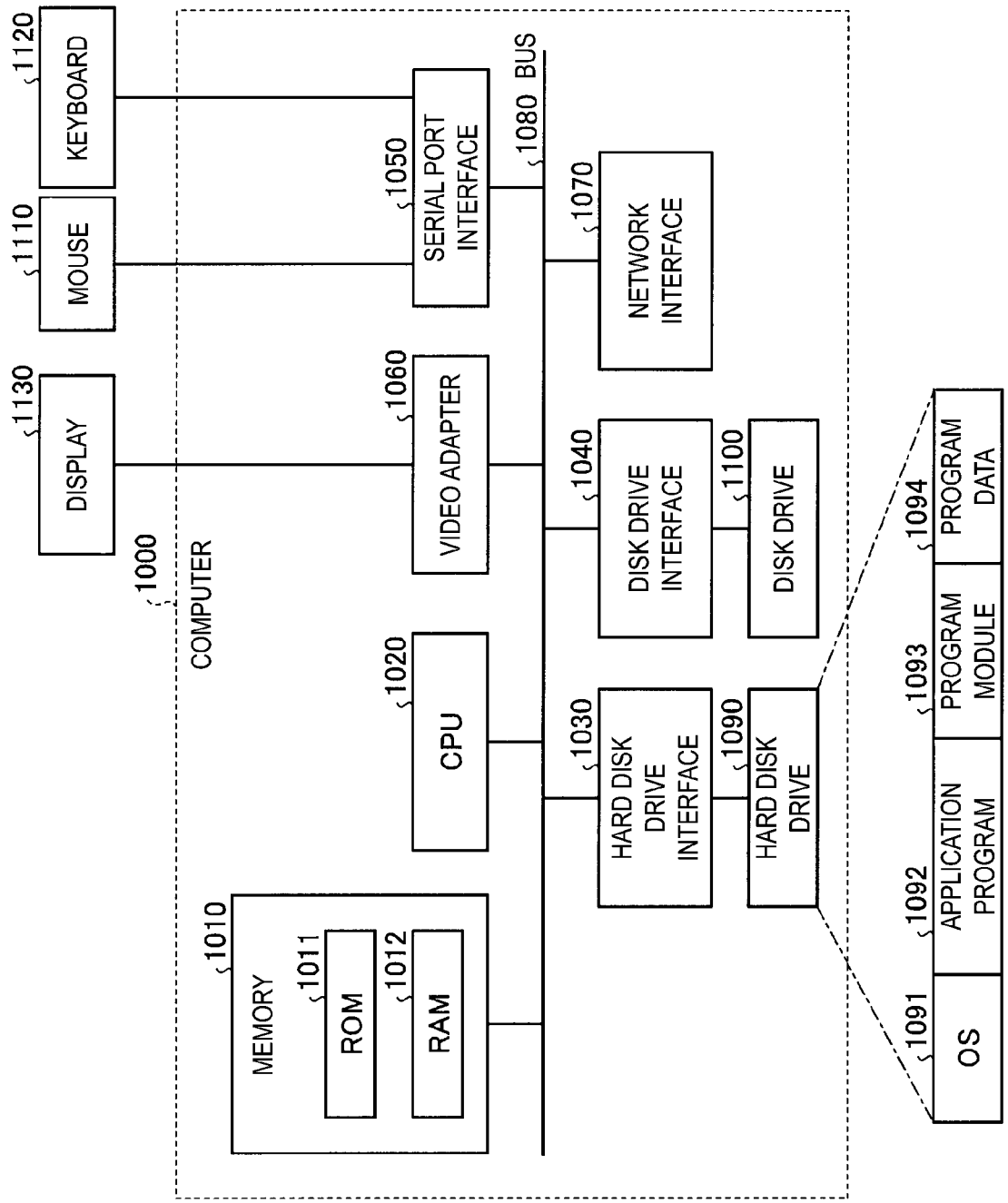
FIG. 16 is a diagram illustrating an exemplary computer that executes a program to implement the management device.
Figure 17:
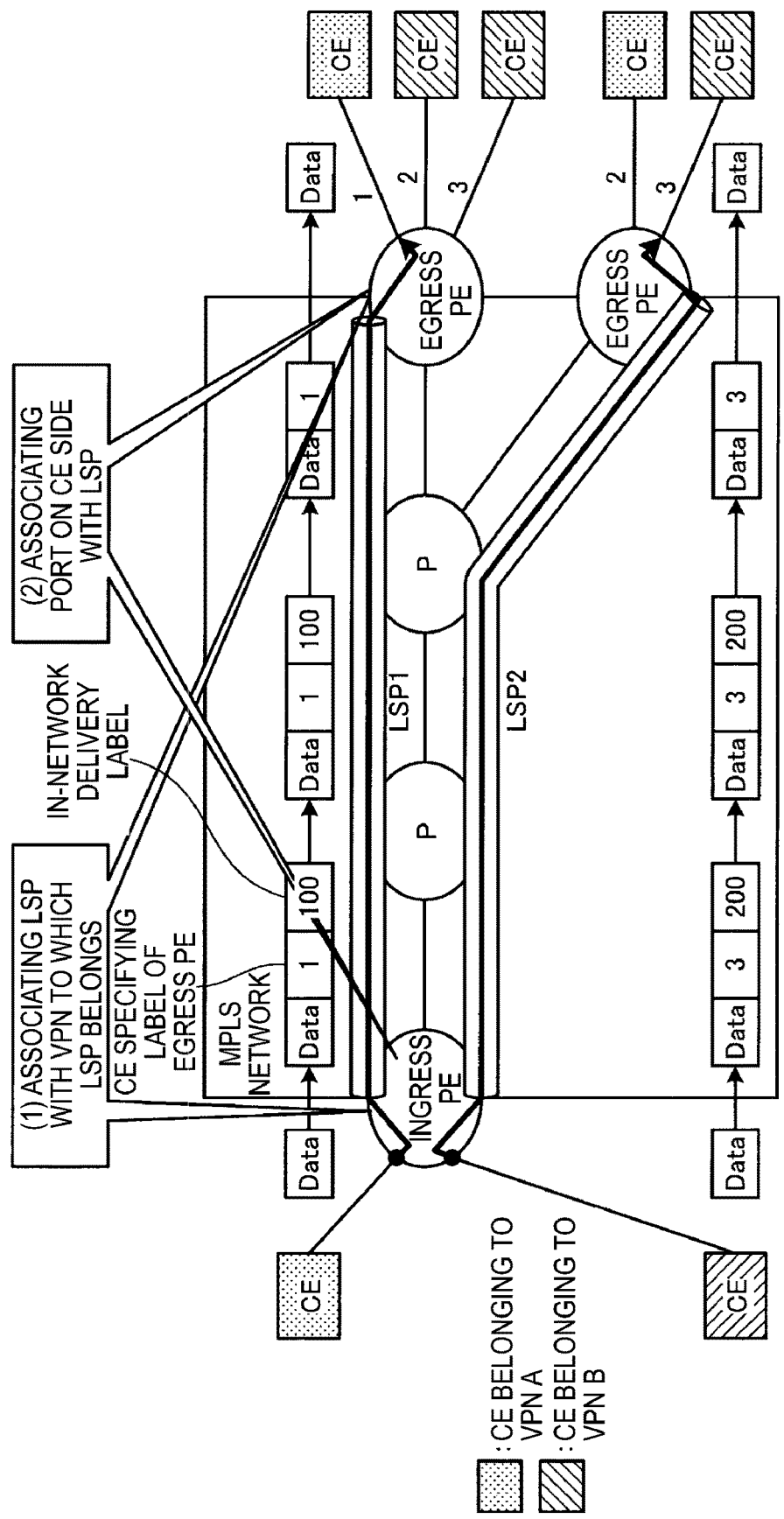
FIG. 17 is a diagram illustrating the MPLS technology.
Figure 18:
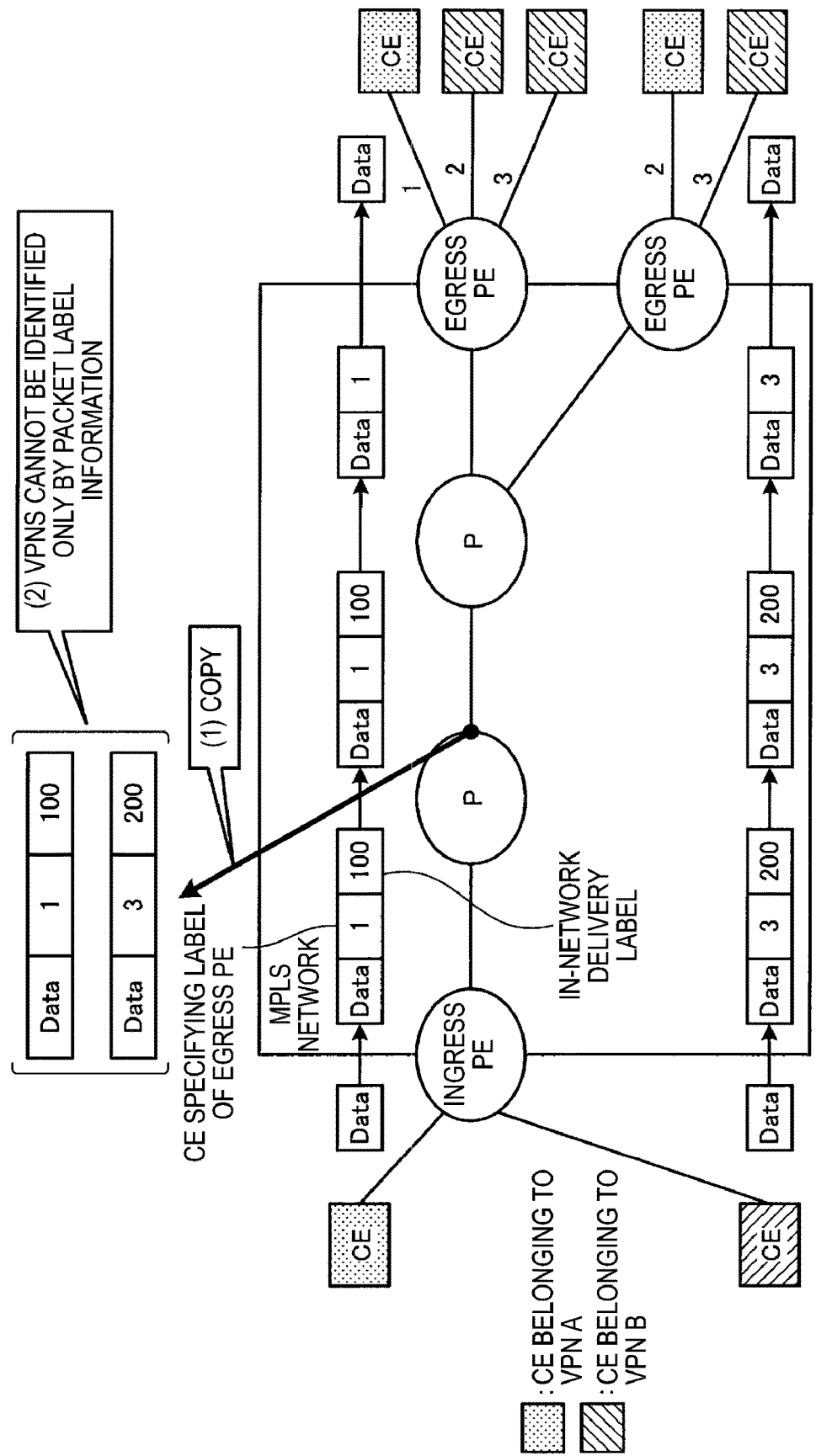
FIG. 18 is a diagram illustrating the MPLS technology.

FIG. 16 is a diagram illustrating an exemplary computer that executes a program to realize the management device 10. A computer 1000 includes, for example, a memory 1010 and a CPU 1020. Further, the computer 1000 includes a hard disk drive interface 1030, a disk drive interface 1040, a serial port interface 1050, a video adapter 1060, and a network interface 1070. These units are connected by a bus 1080.

The memory 1010 includes a read only memory (ROM) 1011 and a RAM 1012. The ROM 1011 stores, for example, a boot program such as a basic input output system (BIOS). The hard disk drive interface 1030 is connected to a hard disk drive 1090. The disk drive interface 1040 is connected to a disk drive 1100. A removable storage medium such as a magnetic disk or an optical disc is inserted into the disk drive 1100. The serial port interface 1050 is connected to, for example, a mouse 1110 and a keyboard 1120. The video adapter 1060 is connected to, for example, a display 1130.

The hard disk drive 1090 stores, for example, an operating system (OS) 1091, an application program 1092, a program module 1093, and program data 1094. That is, a program defining each processing of the management device 10 is implemented as a program module 1093 in which a computer executable code is described. The program module 1093 is stored in, for example, the hard disk drive 1090. For example, the program module 1093 for executing the same process as that performed by the functional configuration in the management device 10 is stored in the hard disk drive 1090. Further, the hard disk drive 1090 may be replaced with a solid state drive (SSD).

Further, setting data used in the process of the embodiment described above is stored as the program data 1094 in the memory 1010 or the hard disk drive 1090, for example. In addition, the CPU 1020 reads out and executes the program module 1093 or the program data 1094 stored in the memory 1010 or the hard disk drive 1090, as necessary, in the RAM 1012.

The program module 1093 and the program data 1094 are not necessarily stored in the hard disk drive 1090, and may be stored in, for example, a removable storage medium and be read out by the CPU 1020 through the disk drive 1100 or the like. Alternatively, the program module 1093 and the program data 1094 may be stored in another computer connected via a network (LAN, a wide area network (WAN), or the like). The program module 1093 and the program data 1094 may be read from another computer via the network interface 1070 by the CPU 1020.

Although embodiments to which the invention made by the inventor is applied have been described, the present invention is not limited by the description and the drawings that form a part of the disclosure of the present invention according to the present embodiments. In other words, various alternative embodiments, examples and operational techniques that persons skilled in the art perform based on the present invention will fall within the scope of the present invention.

REFERENCE SIGNS LIST

1 Communication system
10 Management device
11 Communication unit
12 Storage unit
13 Control unit
14 Management table database (DB)
15 VPN identification information DB
20 MPLS network
21 Ingress PE router
22-1, 22-2 P router
23-1, 23-2 Egress PE router
31-1, 31-2, 32-1 to 32-3, 33-1, 33-2 CE router
131 Packet copy acquisition unit
132 Management table acquisition unit
133 VPN identification unit
134 Registration unit
135 Search unit

The invention claimed is:

1. A management device that manages a multi-protocol label switching (MPLS) network communication system, the management device comprising:
a first acquisition unit, including one or more processors, configured to acquire a packet copied from a node in an MPLS network, the packet comprising an attached first label and an attached second label, the attached first label providing identification information for an MPLS tunnel and the attached second label specifying a customer's edge (CE) router serving as an output destination from a service provider's edge router (egress PE router);
a second acquisition unit, including one or more processors, configured to:
acquire, from the node, a first management table comprising one or more first labels corresponding to one or more MPLS tunnels, wherein the first management table is included in the node that is a copy source;
acquire a second management table comprising one or more second labels identifying CE routers corresponding to the one or more MPLS tunnels and identifying one or more virtual private networks (VPNs) corresponding to the CE routers, wherein the second management table is included in the egress PE router that is an output destination of the acquired packet;

an identification unit, including one or more processors, configured to:
identify the MPLS tunnel through which the packet passes in the MPLS network by selecting the MPLS tunnel from the first management table using the attached first label;
identify the egress PE router to which the packet is output based on the identified MPLS tunnel;
identify a VPN of the packet based on the CE router serving as the output destination from the identified egress PE router, wherein the VPN is identified by selecting the VPN from the one or more VPNs from the second management table using the attached second label;
modify the acquired packet by adding data identifying the VPN to a header and to a payload of the acquired packet; and
output the modified packet for review.

2. The management device according to claim 1, further comprising a registration unit, including one or more processors, configured to register the identification of the VPN in a database in association with 5-tuple information and label information of the packet.

3. The management device according to claim 1, wherein the second acquisition unit is configured to periodically acquire one or more other first management tables included in a plurality of nodes in the MPLS network and one or more other second management tables included in a plurality of egress PE routers.

4. The management device according to claim 3,
wherein the second acquisition unit is configured to acquire a third management table in which information for specifying a CE router that is an input source, information for identifying the VPN to which the CE router that is an input source belongs, identification information of the MPLS tunnel, the attached first label, and the attached second label are associated with each other, the third management table being included in an ingress PE router of the MPLS network, and
the identification unit is configured to:
identify the ingress PE router of the acquired packet and the specified CE router that is an input source by selecting the ingress PE router from the third management table using the attached first label and the attached second label; and
identify, from the third management table, the VPN of the packet based on the CE router that is an input source.

5. The management device according to claim 1, wherein the second acquisition unit integrates a plurality of acquired management tables.

6. A management method executed by a management device that manages a multi-protocol label switching (MPLS) network communication system, the management method comprising:
acquiring a packet copied from a node in an MPLS network, the packet comprising an attached first label and an attached second label, the attached first label providing identification information for an MPLS tunnel and the attached second label specifying a customer's edge (CE) router serving as an output destination from a service provider's edge router (egress PE router);
acquiring, from the node, a first management table comprising one or more first labels corresponding to one or more MPLS tunnels, wherein the first management table is included in the node that is a copy source;
acquire a second management table comprising one or more second labels identifying CE routers corresponding to the one or more MPLS tunnels and identifying one or more virtual private networks (VPNs) corresponding to the CE routers, wherein the second management table is included in the egress PE router that is an output destination of the acquired packet;
identifying the MPLS tunnel through which the packet passes in the MPLS network by selecting the MPLS tunnel from the first management table using the attached first label;
identifying the egress PE router to which the packet is output based on the identified MPLS tunnel;
identifying a VPN of the packet based on the CE router serving as the output destination from the identified egress PE router, wherein the VPN is identified by selecting the VPN from the one or more VPNs from the second management table using the attached second label;
modifying the acquired packet by adding data identifying the VPN to a header and to a payload of the acquired packet; and
outputting the modified packet for review.

7. A non-transitory computer-readable medium storing software comprising instructions executable by one or more computers which, upon such execution, cause the one or more computers to perform operations comprising:
acquiring a packet copied from a node in a multi-protocol label switching (MPLS) network, the packet comprising an attached first label and an attached second label, the attached first label providing identification information for an MPLS tunnel and the attached second label specifying a customer's edge (CE) router serving as an output destination from a service provider's edge router (egress PE router);
acquiring, from the node, a first management table comprising one or more first labels corresponding to one or more MPLS tunnels, wherein the first management table is included in the node that is a copy source;
acquire a second management table comprising one or more second labels identifying CE routers corresponding to the one or more MPLS tunnels and identifying one or more virtual private networks (VPNs) corresponding to the CE routers, wherein the second management table is included in the egress PE router that is an output destination of the acquired packet;
identifying the MPLS tunnel through which the packet passes in the MPLS network by selecting the MPLS tunnel from the first management table using the attached first label;
identifying the egress PE router to which the packet is output based on the identified MPLS tunnel;
identifying a VPN of the packet based on the CE router serving as the output destination from the identified egress PE router, wherein the VPN is identified by selecting the VPN from the one or more VPNs from the second management table using the attached second label;
modifying the acquired packet by adding data identifying the VPN to a header and to a payload of the acquired packet; and
outputting the modified packet for review.

8. The management method according to claim 6, further comprising registering the identification of the VPN in a database in association with 5-tuple information and label information of the packet.

9. The management method according to claim 6, further comprising acquiring, periodically, one or more other first management tables included in a plurality of nodes in the MPLS network and one or more other second management tables included in a plurality of egress PE routers.

10. The management method according to claim 9, further comprising:
  acquiring a third management table in which information for specifying a CE router that is an input source, information for identifying the VPN to which the CE router that is an input source belongs, identification information of the MPLS tunnel, the attached first label, and the attached second label are associated with each other, the third management table being included in an ingress PE router of the MPLS network;
  identifying the ingress PE router of the acquired packet and the specified CE router that is an input source by selecting the ingress PE router from the third management table using the attached first label and the attached second label; and
  identifying, from the third management table, the VPN of the packet based on the CE router that is an input source.

11. The management method according to claim 6, further comprising integrating a plurality of acquired management tables.

12. The non-transitory computer-readable medium according to claim 7, further comprising registering the identification of the VPN in a database in association with 5-tuple information and label information of the packet.

13. The non-transitory computer-readable medium according to claim 7, further comprising acquiring, periodically, one or more other first management tables included in a plurality of nodes in the MPLS network and one or more other second management tables included in a plurality of egress PE routers.

14. The non-transitory computer-readable medium according to claim 13, further comprising:
  acquiring a third management table in which information for specifying a CE router that is an input source, information for identifying the VPN to which the CE router that is an input source belongs, identification information of the MPLS tunnel, the attached first label, and the attached second label are associated with each other, the third management table being included in an ingress PE router of the MPLS network;
  identifying the ingress PE router of the acquired packet and the specified CE router that is an input source by selecting the ingress PE router from the third management table using the attached first label and the attached second label; and
  identifying, from the third management table, the VPN of the packet based on the CE router that is an input source.

15. The non-transitory computer-readable medium according to claim 7, further comprising integrating a plurality of acquired management tables.

* * * * *